US009068022B1

(12) United States Patent
Han et al.

(10) Patent No.: US 9,068,022 B1
(45) Date of Patent: Jun. 30, 2015

(54) PROCESS FOR MAKING A MODIFIED STARCH PRODUCT

(71) Applicant: General Mills, Inc., Minneapolis, MN (US)

(72) Inventors: Ling-Hua Han, Plymouth, MN (US); Ya-Jane Wang, Fayetteville, AR (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 13/863,328

(22) Filed: Apr. 15, 2013

Related U.S. Application Data

(63) Continuation-in-part of application No. 12/498,392, filed on Jul. 7, 2009, now abandoned, and a continuation-in-part of application No. 12/436,390, filed on May 6, 2009, now abandoned.

(60) Provisional application No. 61/081,125, filed on Jul. 16, 2008, provisional application No. 61/050,711, filed on May 6, 2008.

(51) Int. Cl.
| | | |
|---|---|---|
| C08B 31/00 | (2006.01) | |
| C08B 31/08 | (2006.01) | |
| C08B 31/12 | (2006.01) | |
| A61K 31/718 | (2006.01) | |
| C08B 31/18 | (2006.01) | |
| A23L 1/0522 | (2006.01) | |

(52) U.S. Cl.
CPC ............ *C08B 31/18* (2013.01); *A23L 1/05223* (2013.01)

(58) Field of Classification Search
CPC ........ C08B 31/00; C08B 31/12; C08B 33/04; C08B 35/04; A23L 1/05223; A23L 1/005
USPC ..................... 536/102, 111, 124, 105; 514/60
See application file for complete search history.

(56) References Cited

U.S. PATENT DOCUMENTS

| | | | |
|---|---|---|---|
| 3,951,947 A | 4/1976 | Schanefelt et al. | |
| 3,969,340 A | 7/1976 | Tessler et al. | |
| 3,970,767 A | 7/1976 | Tessler et al. | |
| 4,000,128 A | 12/1976 | Del Valle et al. | |
| 4,048,434 A * | 9/1977 | Speakman ................ | 536/105 |
| 4,112,222 A | 9/1978 | Jarowenko | |
| 4,120,982 A | 10/1978 | Eastman et al. | |
| 4,120,983 A | 10/1978 | Del Valle et al. | |
| 4,251,560 A | 2/1981 | Dell et al. | |
| 4,379,919 A | 4/1983 | Tessler et al. | |
| 4,431,800 A | 2/1984 | Leusner et al. | |
| 4,623,549 A | 11/1986 | Katt et al. | |
| 4,828,833 A | 5/1989 | Cordon | |
| 4,847,371 A | 7/1989 | Schara et al. | |
| 4,885,180 A | 12/1989 | Cochran et al. | |
| 4,973,447 A | 11/1990 | Seib et al. | |
| 4,981,709 A | 1/1991 | Furcsik et al. | |
| 5,064,663 A | 11/1991 | Murray et al. | |
| 5,110,612 A | 5/1992 | Quarles et al. | |
| 5,234,707 A | 8/1993 | Merkenich et al. | |
| 5,294,453 A | 3/1994 | Quarles et al. | |
| 5,486,375 A | 1/1996 | Yoder et al. | |
| 5,569,480 A * | 10/1996 | De Coninck et al. ......... | 426/573 |
| 5,576,043 A | 11/1996 | Stankus et al. | |
| 5,641,349 A * | 6/1997 | Koubek et al. ............. | 106/206.1 |
| 5,851,959 A | 12/1998 | Bernu | |
| 5,976,582 A | 11/1999 | Gonze et al. | |
| 6,102,254 A | 8/2000 | Ross | |
| 6,217,921 B1 | 4/2001 | Lanner et al. | |
| 6,352,732 B2 | 3/2002 | Lanner et al. | |
| 6,488,980 B1 | 12/2002 | Jeffcoat et al. | |
| 6,541,060 B2 | 4/2003 | Jeffcoat et al. | |
| 6,551,647 B1 | 4/2003 | Lelli | |
| 6,689,197 B2 | 2/2004 | Dick et al. | |
| 6,699,363 B2 | 3/2004 | Moffett | |
| 6,821,548 B1 | 11/2004 | Buwalda et al. | |
| 7,094,817 B2 | 8/2006 | Halley et al. | |
| 2001/0053401 A1 | 12/2001 | Lanner et al. | |
| 2005/0046356 A1 | 3/2005 | Kwak | |
| 2005/0079598 A1 | 4/2005 | Davis | |
| 2005/0084591 A1 | 4/2005 | Shukla et al. | |
| 2005/0238784 A1 | 10/2005 | Shukla et al. | |
| 2006/0251768 A1 | 11/2006 | Bouquerand | |
| 2007/0020367 A1 | 1/2007 | Yoo | |

FOREIGN PATENT DOCUMENTS

| | | |
|---|---|---|
| EP | 0491298 | 8/1994 |
| EP | 0776610 | 6/1997 |
| EP | 1072196 | 1/2001 |
| EP | 0685171 | 4/2002 |

(Continued)

OTHER PUBLICATIONS

Aziz et al., "Hydroxypropylation and Acetyiation of Sago Starch", Malaysian Journal of Chemistry, 6:1, 048-054 (2004).

J. Michaelides Ph.D,, et al. "Alternatives to Sodium Chloride Ingredients and Methods", Guelph Food Technology Centre Literature, Review, Project: INT 142-6 (Dec. 22, 2008).

Wattanachant et al. "Characterisation of hydroxypropylated crosslinked sago starch as compared to commercial modified starches", Songklanakarin J. Sci. Technol. 24(3): 439-450 (2002).

Wattanachant et al., "Effect of crosslinking reagents and hydroxypropylation levels on dual-modified sago starch properties", Food Chemistry 80, pp. 463-471 (2003).

(Continued)

*Primary Examiner* — Shaojia Anna Jiang
*Assistant Examiner* — Michael C Henry
(74) *Attorney, Agent, or Firm* — Aleya Champlin; Annette M. Frawley

(57) ABSTRACT

A process for modifying starch is described. The process can be used as an alternative to conventional starch modification processes, such as substitution and crosslinking. The process and resulting product can reduce, substantially reduce, substantially eliminate or eliminate the sodium level typically associated with conventionally modified starch products.

13 Claims, 3 Drawing Sheets

(56) References Cited

FOREIGN PATENT DOCUMENTS

| | | | |
|---|---|---|---|
| EP | 1091658 | | 3/2003 |
| EP | 1722643 | | 11/2006 |
| GB | 741742 | A * | 12/1955 |
| JP | 2005171112 | | 6/2005 |
| WO | WO-00-01251 | | 1/2000 |
| WO | WO-00/04784 | | 2/2000 |
| WO | WO-01/32033 | | 5/2001 |
| WO | WO-2004/099255 | | 11/2004 |
| WO | WO-2005/079598 | | 9/2005 |

OTHER PUBLICATIONS

Ya-Jane Wang et al, "Effects of Modification Sequence on Structures and Properties of Hydroxypropylated and Crosslinked Waxy Maize Starch", Starch 52 p. 406-412 (2000).

Yangsheng Wu et al., "Acetylated and Hydroxypropylated Distarch Phosphates from Waxy Barley: Past Properties and Freeze-Thaw Stability", Cereal Chem. 67(2):202-208 (1990).

* cited by examiner

PROCESS FOR MAKING A MODIFIED STARCH PRODUCT

CROSS-REFERENCE TO RELATED APPLICATIONS

This application is a continuation-in-part of U.S. patent application Ser. No. 12/436,390, filed on May 6, 2009, which claims the benefit of priority of U.S. Provisional Patent Application No. 61/050,711, filed May 6, 2008, and is also a continuation-in-part of U.S. patent application Ser. No. 12/498,392, filed on Jul. 7, 2009, which claims the benefit of priority of U.S. Provisional Patent Application No. 61/081,125, filed Jul. 16, 2008, each of which applications is incorporated by reference herein in its entirety.

BACKGROUND OF THE INVENTION

Modified starches have been used for years in many diverse applications. There is a continuing need to improve upon starch modification processes and modified starches to meet various demands of these applications.

One conventional method for modifying starch, hydroxypropylation, involves the addition of sodium sulfate and sodium hydroxide in addition to propylene oxide to a slurry of native or modified starch. Sodium hydroxide raises the pH of the slurry to about 11.5, thereby facilitating the hydroxypropylation reaction between the starch and the propylene oxide. Hydroxypropylated starch, in a high pH environment, will gelatinize, so sodium sulfate is added to the starch slurry, for example, at a level of about 10% or more on a dry basis, in order to inhibit gelatinization of the hydroxypropylated starch. After hydroxypropylation has been completed, the pH of the slurry is reduced by adding an acid, and the resulting hydroxypropylated modified starch is washed and dried for further use. A schematic diagram of this conventional process is shown in FIG. 1.

The modified starch resulting from the conventional hydroxypropylation reaction contains sodium salt at a level of about 15-25% by dry weight of the modified starch before the washing step. The washing step typically reduces the sodium salt to a level of about 0.5% or less on a dry basis.

Another conventional method for modifying starch is by cross-linking the starch. This can be done by adding cross-linking agents, including, but not limited to, a mixture of sodium trimetaphosphate (STMP) and sodium tripolyphosphate (STPP), or phosphorus oxychloride and epichlorohydrin, to either a native starch slurry or starch slurry that has previously been hydroxypropylated. About 5% sodium chloride is added to the reaction in order to modulate the cross-linking process to provide uniformity and consistency in this typically fast reaction. The resulting modified starch contains sodium salt at a level of about 5-25% by dry weight (before the washing step).

BRIEF SUMMARY OF THE INVENTION

The present invention is directed to a process for making a modified starch, to modified starch products resulting from this process, and to related products containing the modified starch as an ingredient, processing aid, or formula component. The process and resulting product according to the present invention reduce, substantially reduce, or eliminate the sodium level typically associated with conventional modified starch products.

The process of the present invention can be used as an alternative to conventional starch modification processes, such as substitution and crosslinking. The resulting modified starch product can be used in place of conventionally modified starches in a wide variety of applications, including, but not limited to, food products, pharmaceutical products, nutraceutical products, paper products, personal care products, and the like.

DETAILED DESCRIPTION OF THE INVENTION

By using the process of the present invention, a modified starch product that has a low or reduced sodium content, or that is substantially free of sodium, can be made. The modified starch of the present invention can be used to reduce, substantially reduce, substantially eliminate, or eliminate the sodium content of many products.

Figure 1:
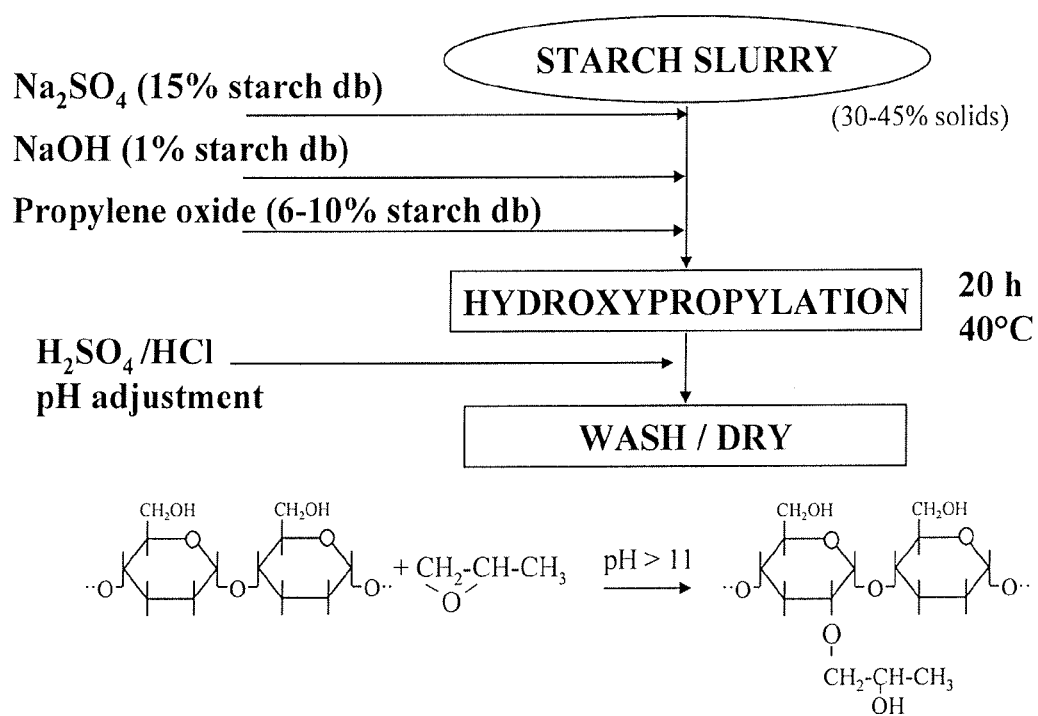
FIG. 1 is a schematic diagram of a conventional starch modification process.
Figure 2:
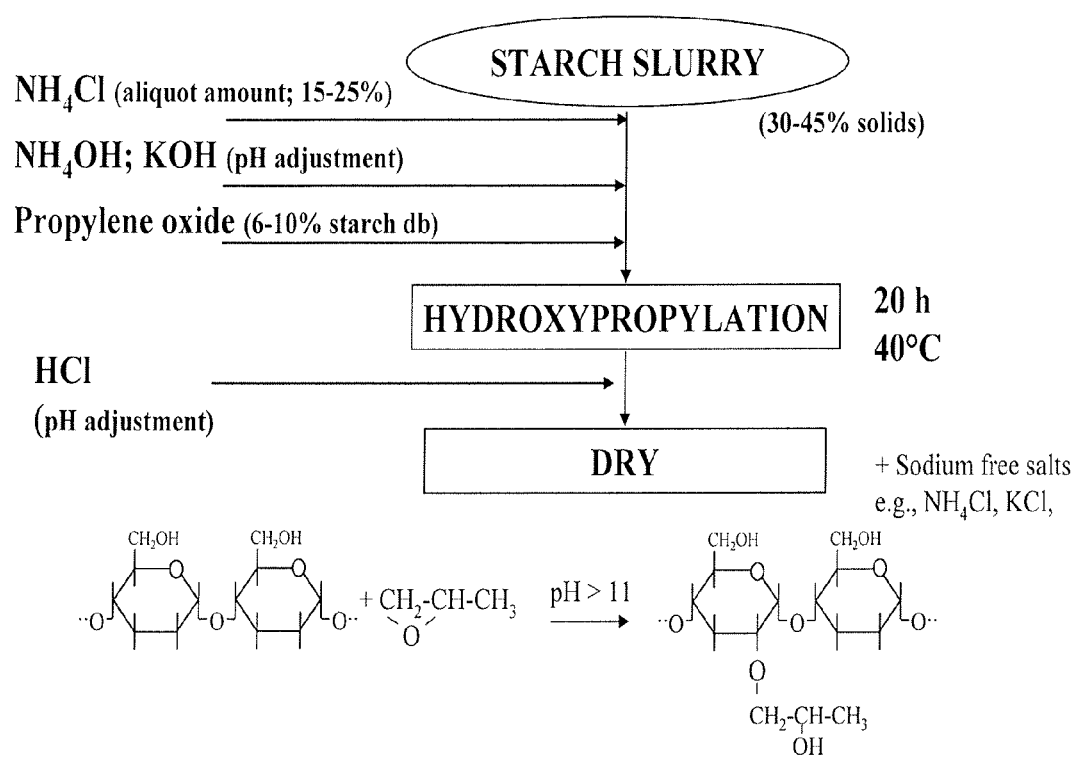
FIG. 2 is a schematic diagram of one embodiment of the process for making a modified starch product in accordance with the present invention.

The process of the present invention involves the use of non-sodium salts and non-sodium alkaline compounds to facilitate the hydroxypropylation reaction described above. The hydroxypropylation reaction can take from a few hours to over 20 hours, depending on the reaction conditions and the desired properties of the end product. Generally, a reaction time of about 18-20 hours is suitable. Once the starch has been hydroxypropylated using this process, the pH of the slurry is reduced, and the modified starch is dried for further use. Because the modified starch does not contain sodium, a washing step is not necessary, but in some instances a washing step may be incorporated into the process, depending on the intended use of the modified starch product. A schematic diagram of one embodiment of the process of the present invention is shown in FIG. 2.

Similarly, the modified starch can be made using other starch modification reactions, such as cross-linking the starch, by replacing sodium-containing compounds used in such reactions with non-sodium compounds. The modified starch can also be made by using a combination of starch modification processes, such as hydroxypropylation and cross-linking, to achieve the desired properties.

The process of the present invention can be used to modify starch from a wide variety of sources, such as, but not limited to, corn/maize, wheat, rice, buckwheat, barley, oat, millet, rye, sorghum, potato, sweet potato, tapioca/cassava, arrowroot, sago, arracacha, banana, plantain, malanga, kudzu, oca, canna, taro, yams, chestnuts, edible beans, such as lentils, favas, mung bean and peas. In addition to modifying a native starch from these or other sources, the process of the present invention can be used to modify a previously modified starch. The modified starch product resulting from the process of the present invention can also be further modified using other starch modification processes.

Non-sodium salts suitable for use in the process of the present invention include, but are not limited to, the following:

The inorganic or organic salts of alkali metals (e.g., lithium, potassium, caesium), and alkaline earth metals (e.g., beryllium, magnesium, calcium), or acid or base addition salts formed with cations such as bismuth, barium, aluminum, copper, cobalt, nickel, cadmium, ammonium, and the like;

Chloride salts such as potassium chloride, lithium chloride, caesium chloride, europium chloride, gadolinium chloride, terbium chloride, magnesium chloride, calcium chloride, ammonium chloride, choline chloride, and the like;

Sulfate salts such as potassium sulfate, magnesium sulfate, calcium sulfate, ammonium sulfate, aluminum sulfate, and the like;

Phosphate salts such as mono-, di-, tri-basic potassium, calcium, ammonium, and the like;

Potassium bisulfate, potassium carbonate or bicarbonate; and

Cation salts formed with organic acid anions such as citrate, malate, lactate, gluconate, tartrate, succinate, formate, acetate, propionate, glucuronate, benzoate, oxalic, and the like.

Of these salts, the preferred non-sodium salts for use in the present invention include potassium chloride, ammonium chloride, magnesium chloride, calcium chloride, zinc chloride, aluminum chloride, potassium sulfate, magnesium sulfate, potassium bitartrate, and a combination thereof.

The advantage of the modified starch product made by the process of the present invention is that the modified starch can be used in reduced sodium, low sodium or sodium-free products, such as food products, and can provide all the textural properties obtained by using a conventionally modified starch ingredient without adding a significant amount of sodium to the food product or other type of product.

As will be appreciated by those skilled in the art, although the process of the present invention does not utilize sodium-containing reactants to make the modified starch product, some trace levels of sodium may be present in the modified starch made by the process of the present invention due to factors other than the modification process itself.

One key advantage of the modified starch of the present invention is that the modified starch can be used as an ingredient or formula component to reduce the sodium content in a wide variety of products, such as food products, while providing the same or similar textural and other organoleptic or physical properties obtained by using a conventionally modified starch ingredient in such products.

As used herein, the expressions "substantially free of sodium," "low sodium," "reduced sodium", and "sodium-free" shall refer to a sodium level or levels that are less than the sodium content of comparable reference products containing conventionally modified starch ingredients. In a preferred embodiment, a low sodium modified starch made in accordance with the present invention is used to prepare food products that are low sodium, reduced sodium, or sodium-free, and that have substantially the same texture, viscosity and taste properties of comparable sodium-containing reference food products made using a conventionally modified starch. As used herein, the expression "reference food" shall refer to a food product having substantially the same formula as a food product comprising a low sodium modified starch, but without the low sodium modified starch and related formula modifications.

Products made using the modified starch of the present invention may be labeled to reflect the sodium reduction if the products meet labeling regulations or guidelines regarding the sodium content of a given product or type of product.

For example, for food products, "reduced sodium" as defined by the U.S. Food and Drug Administration means at least 25% less than an appropriate reference food, as defined in 21 CFR §101.61(b)(6), and "low sodium" means 140 mg sodium or less per RACC, or "reference amounts customarily consumed", as defined in 21 CFR §101.61(b)(4). In one embodiment of the present invention, the modified starch product of the present invention is used to make a reduced sodium food product which contains at least about 25% less sodium than an appropriate reference food. In another embodiment of the present invention, the modified starch product of the present invention is used to make a low sodium food product containing about 140 mg sodium or less per RACC.

Although the following Example I describes a hydroxypropylation reaction, the process of the present invention can be applied to any starch modification reaction which conventionally involves a sodium salt, in order to reduce or eliminate the sodium content of the resulting modified starch, such as, but not limited to, the starch modification reactions described in 21 CFR §172.892. Included in these starch modification reactions are substitution and cross-linking reactions. The modified starch product of the present invention can be made using a combination of starch modification reactions to obtain a modified starch product having the desired functional and organoleptic properties.

The modified starch product can be mechanically blended with any native starches and/or modified starches described in 21 CFR §172.892 in various ratios to produce modified starch products with functionality suitable to a variety of food and other applications.

It has been observed that modified starch products made with different salts have different effects on the gelling and pasting properties of the modified starch products, and require different levels of non-sodium salts to complete the modification process. By using a particular non-sodium salt during the starch modification process, it is possible to make a low sodium modified starch with the desired gelatinization and other properties for a particular application. For example, if a magnesium salt is used during the starch modification process instead of a sodium salt, the gel onset temperature of the low sodium modified starch is lower, i.e., the low sodium modified starch gels at a lower temperature, than if a calcium salt is used. Using these properties, it is possible to select and combine various low sodium modified starches, and native and conventionally modified starches, to customize the modified starch characteristics, such as texture, viscosity, taste and sodium content, as needed for a particular application.

Example I

To evaluate the properties of the modified starches made by the process of the present invention, a variety of non-sodium salts were used in the hydroxypropylation of native starch, and properties of the resulting modified starch product were compared to those of a native starch and a conventionally modified starch.

Waxy corn starch was obtained from a commercial source and modified according to the procedure by Wang and Wang (Starch/Stärke 52 (2000) 406-412) with modifications.

To make the modified starch products of the present invention, a starch slurry containing dry starch at 35% solid concentration (dry starch basis) was prepared and salt ($NH_4Cl$, $KCl$, $CaCl_2$, or $MgCl_2$ at their respective maximum concentrations) was added. Then the pH of the starch slurry was adjusted to 11.5 by KOH, instead of NaOH, in order to reduce the sodium content. Propylene oxide was added at 8% on a dry weight basis to initiate the hydroxypropylation, and the reaction took place for 18 hours. Afterward, the slurry pH was neutralized to 5.5-6.0 with HCl, and the modified starch product of the present invention was recovered and dried at 40° C. to moisture content below about 12%.

As used herein, "HP" shall refer to "hydroxypropylated".

As used herein, "HP-NH$_4$Cl", "HP-KCl", "HP—CaCl$_2$" and "HP-MgCl$_2$" shall refer to a modified starch product of the present invention made by replacing sodium chloride in the modification process with ammonium, potassium, calcium or magnesium chloride, respectively.

Thermal Properties

The gelatinization temperature and enthalpy of the modified starch products, and of a native starch and a conventionally modified starch, were measured with a differential scanning calorimeter (DSC), and the results are summarized in Table 1. As used herein, "HP-(salt)" refers to a modified starch product that has been hydroxypropylated using the named salt and without a subsequent washing step. HP—NH$_4$Cl waxy corn had the highest gelatinization temperature and HP—MgCl$_2$ had the lowest onset gelatinization temperature and enthalpy, as shown in Table 1. The significantly lower enthalpy values of the modified starch products made in accordance with the present invention suggest that some of their crystalline structures were disrupted during the modification process. Commercial HP waxy corn starch had a significantly lower gelatinization temperature due to the added hydroxypropyl groups that weaken the crystalline structure.

TABLE 1

Gelatinization properties of native and HP-rnoclified starches

| | Gelatinization | | | |
|---|---|---|---|---|
| | Onset Temp (° C.) | Peak Temp (° C.) | End Temp (° C.) | Enthalpy (J/g) |
| Native waxy corn starch | 68.7 | 73.1 | 80.0 | 14.8 |
| Conventional HP waxy corn | 62.7 | 68.4 | 76.2 | 14.1 |
| HP-NH$_4$Cl | 75.8 | 80.6 | 86.3 | 7.6 |
| HP-KCl | 75.7 | 79.7 | 85.2 | 9.1 |
| HP-CaCl$_2$ | 77.4 | 83.1 | 89.2 | 3.2 |
| HP-MgCl$_2$ | 74.9 | 80.3 | 86.8 | 7.4 |

Pasting Properties

The pasting properties, including pasting temperature, peak viscosity, breakdown, and final viscosity, of the modified starches were evaluated at 6% (db) by a Micro ViscoAmyloGraph®, available from C.W. Brabender Instruments, Inc., South Hackensack, N.J. The results, and the results of the same analysis performed on a native starch and a conventionally hydroxypropylated starch, are summarized in Table 2.

Figure 3:
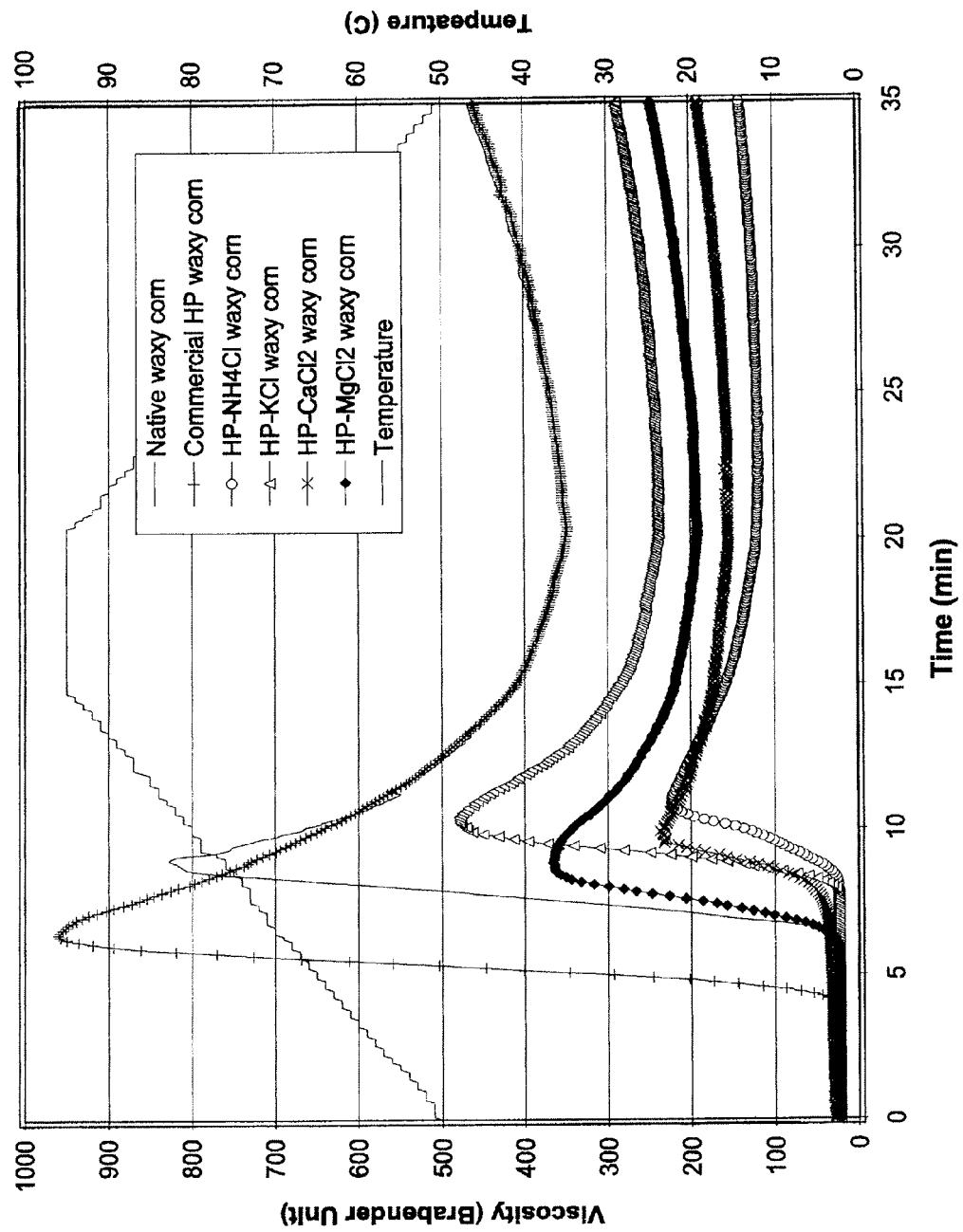
FIG. 3 is a graph showing viscosity and pasting profiles of a native starch, a conventionally modified starch, and modified starch products made in accordance with the present invention.

HP-NH$_4$Cl waxy corn had the lowest overall viscosity profile, whereas HP-KCl waxy corn had the highest peak and final viscosity among all the modified starch samples, as shown in Table 2 and FIG. 3. All of the modified starch products made in accordance with the present invention had higher pasting temperatures and lower viscosities compared with the native starch and the conventionally modified HP starch. The conventionally modified HP waxy corn starch displayed a significantly higher viscosity than the native starch because the substituted hydroxypropylated groups weaken the crystalline structure and improve water absorption.

TABLE 2

Pasting properties of native and HP-modified starches

| | Pasting Temperature (° C.) | Peak Viscosity (BU*) | Final Viscosity (BU) | Breakdown (BU) | Setback (BU) |
|---|---|---|---|---|---|
| Native waxy corn starch | 69.9 | 827 | 468 | 475 | 115 |
| Conventional HP waxy corn | 62.8 | 960 | 461 | 610 | 109 |
| HP-NH$_4$Cl | 76.4 | 223 | 139 | 101 | 17 |
| HP-KCl | 74.7 | 479 | 288 | 240 | 48 |
| HP-CaCl$_2$ | 71.1 | 237 | 190 | 3 | 36 |
| HP-MgCl$_2$ | 69.7 | 366 | 246 | 174 | 54 |

(*BU refers to "Brabender Units")

The low sodium modified starch of the present invention may include the salt residue remaining after the modification reaction has taken place. In a conventional sodium-based reaction, the residual sodium salt associated with a modified starch is typically washed out. The non-sodium salt residues associated with the low sodium modified starch of the present invention may or may not be washed out, depending on the desired effect of the low sodium modified starch. Table 3 summarizes the various salt residue levels of some embodiments of the low sodium modified starch.

TABLE 3

Salt residue in hydroxpropylated low sodium modified starches (LSMS)

| Salt as Process Aid | Salt content (% total in finished LSMS) | Preferred range in finished ISMS |
|---|---|---|
| NH$_4$Cl | 0*-41$^§$ | 0-30 |
| KCl | 0-40 | 0-30 |
| CaCl$_2$ | 0-43 | 0-30 |
| MgCl$_2$ | 0-65 | 0-30 |

*0% indicates the salt residue in starch resultant was washed out,
$^§$The highest level of salts in modified starch occurs when salt was added its saturation point and no wash step was applied at the end of reaction process.

In some embodiments, it may be desirable to retain or optimize the residual non-sodium salt levels due to the nutritive significance of a particular salt residue. The low sodium modified starch in these embodiments serves to provide an additional source of the nutritive salt in the finished product.

The following examples present a variety of food products made with the modified starch product of the present invention. Although these examples describe food products, the modified starch product can also be used in any type of non-food products in which a conventionally modified starch is used.

In the Examples below, the columns marked as "A" describe conventional food product formulas, and the columns marked "B" describe food product formulas made with the modified starch product of the present invention. The food products are made using conventional methods, but utilize the modified starch product of the present invention as an ingredient in place of or in combination with conventionally modified starches. The "B" formulas containing the modified starch product resulted in finished food products having texture, viscosity and taste properties that were comparable to the products made using the "A" formulas, but with lower or significantly lower sodium levels. All percentages are given as percent by weight unless otherwise indicated.

Example II

Sour Cream Sauce Dry Mix

| Ingredient | A(dry mix) % | B(dry mix) % |
|---|---|---|
| DRY MIX | | |
| Sour Cream powder | 30-40 | 20-30 |
| Paselli EL 2030 | 18-22 | 0-12 |
| Beatreme 2784 | 9-11 | 15-22 |
| Salt | 7-9 | 0-5 |
| Sugar | 8-21 | 8-21 |
| Guar Gum | 1-2 | 1-2 |
| Potassium Chloride | 0-3 | 0-3 |
| Low Sodium Modified Starch | 0 | 6-22 |
| Flavorings | 0-0.8 | 0-0.8 |
| Water | | |
| Total | 100 | 100 |
| SOUR CREAM SAUCE | | |
| Dry Mix | 15 | 15 |
| Water | 85 | 85 |

Example III

Cheese Flavor Seasoning (Topical)

| Ingredient | A % | B % |
|---|---|---|
| White Cheese powder | 50-60 | 50-60 |
| Sweet whey | 6-12 | 0-6 |
| Reduced minerals whey | | 6-12 |
| Fine Flour Salt | 12-16 | 0-3 |
| Maltodextrin | 8-10 | 8-10 |
| MSG | 0.2-0.6 | 0.2-0.6 |
| Natural Flavorings | 2-2.5 | 2-2.5 |
| Low sodium salt (fine) | | 6-12 |
| Low sodium Modified Starch | | 4-6 |
| Total | 100 | 100 |

Example IV

Instant Chicken Soup Base

| Ingredients | A % | B % |
|---|---|---|
| DRY MIX | | |
| Nonfat Dry Milk | 25-30 | 25-30 |
| Mira Thick 468 | 25-31 | 0-31 |
| Maltodextrin | 10-13 | 10-13 |
| Shortening Powder | 5-7 | 5-7 |
| Chicken flavor | 5-8 | 5-8 |
| Salt | 6.5-7.5 | 2-4.5 |
| Potassium Chloride | | 1.5-2.5 |
| Guar Gum | 0.3-0.5 | 0.3-0.5 |
| Natural Flavorings | 0.2-1 | 0.2-1 |
| Savory Flavors | 0.5-1.2 | 0.5-1.2 |
| Spice | 0.2-0.5 | 0.2-0.5 |
| Low Sodium Modified Starch | | 4-31 |
| Total | 100 | 100 |
| SOUP | | |
| Dry Mix | 10 | 10 |
| Water | 90 | 90 |

Example V

Instant Mashed Potato

| Ingredients | A % | B % |
|---|---|---|
| Water | 60-62 | 60-62 |
| Potato Flakes | 18-21 | 15-20 |
| Non fat dry milk | 8-10 | 8-10 |
| Unsalted Butter | 4-6 | 4-6 |
| Salt | 0.8-1 | 0.2-0.5 |
| Sugar | 0-0.4 | 0.2-0.4 |
| Yeast Extract | 0.05-0.2 | 0.05-0.2 |
| Spice and Flavor | 0.05-0.1 | 0.05-0.1 |
| Low Sodium Modified Starch | | 0.5-2 |
| Total | 100 | 100 |

Example VI

Mushroom Cream Soup or Sauce

| Ingredients | A % | B % |
|---|---|---|
| Patent Flour | 2-3 | 2-3 |
| Salt | 1-1.5 | 0.3-0.7 |
| Chicken Bouillon | 0.6-1 | 0.6-1 |
| Mushroom Pieces | 7-9 | 7-9 |
| Spray Dried Veg Fat | 10-15 | 10-15 |
| Water | 23-26 | 23-26 |
| Potassium Chloride | | 0.1-0.3 |
| Spice and Seasonings | 0.05-0.1 | 0.05-0.1 |
| Heavy Cream | 35-40 | 35-40 |
| Polar Gel Food Starch | 2-3 | 0-2 |
| Milk Solids | 3-4 | 3-4 |
| Natural Flavorings | 0.2-0.7 | 0.2-0.7 |
| Low Sodium Modified Starch | | 0.5-2 |
| Total | 100 | 100 |

Example VII

Cream Mushroom Soup

| Ingredients | A % | B % |
|---|---|---|
| Heavy Cream | 15-17 | 15-17 |
| Mira Thick-468 | 1.5-2.5 | 0-2.5 |

-continued

| Ingredients | A % | B % |
|---|---|---|
| Salt | 0.8-1 | 0.2-0.5 |
| Mushroom Powder | 0.5-1 | 0.5-1 |
| Low Sodium Modified Starch | | 0.3-2 |
| Potassium Chloride | | 0.1-0.2 |
| Chicken Bouillon | 1-2 | 1-2 |
| Spice and Seasonings | 0.03-0.2 | 0.03-0.2 |
| Butter | 1-2 | 1-2 |
| Sugar | 0-0.2 | 0-0.5 |
| Water | 70-80 | 70-80 |
| Total | 100 | 100 |

Example VIII

Seasoning—Spicy Beer

| Ingredients | A % | B % |
|---|---|---|
| Dried Beer Extract ® | 10-15 | 10-15 |
| Sweet Whey | 10-15 | 10-15 |
| Maltodextrin | 5-7 | 0-5 |
| Flour Salt | 20-23 | 10-15 |
| Kwick Stik (Domino Sugar) | 15-25 | 15-25 |
| Ground Paprika | 10-15 | 10-15 |
| Canola Oil | 2-3 | 2-3 |
| Ground Cayenne Pepper | 1-2 | 1-2 |
| Low Sodium Modified Starch | | 4-5 |
| Citric Acid | | 0.05-0.1 |
| Potassium Chloride | | 1-3 |
| Total | 100 | 100 |

Example IX

Chicken Broth

| Ingredients | A % | B % |
|---|---|---|
| Chicken Flavor | 0.5-1 | 0.5-1 |
| National 465 | 1-2 | 0-1.5 |
| Salt | 0.8-1 | 0.3-0.5 |
| Chicken fat | 0.4-0.6 | 0.4-0.6 |
| Sodic | | 0.4-2 |
| Potassium Chloride | | 0.1-0.3 |
| MSG | 0.3-0.5 | 0.3-0.5 |
| STipe and Seasonings | 0.03-0.2 | 0.03-0.2 |
| Hydrolyzed Vegetable Protein | 0.4-0.6 | 0.4-0.6 |
| Water | 95 | 95 |
| Total | 100 | 100 |

Example X

Extruded Ready-to-Eat Cereal

| Ingredients | A % | B % |
|---|---|---|
| Corn Flour | 45-47 | 45-47 |
| Sugar | 20-25 | 20-25 |
| Corn Syrup | 5-9 | 5-9 |
| Modified Starch | 3-5 | 0-3 |
| Low Sodium modified starch | | 1-2 |
| Vegetable Oil | 1-3 | 1-3 |
| Salt | 1.3-1.5 | 0.5-0.7 |
| Food Coloring | 0.1-0.2 | 0.1-0.2 |
| Trisodium Phosphate | 0.1-0.2 | 0.1-0.2 |
| Calcium Carbonate | 0.4-0.6 | 0.4-0.6 |
| Tricalcium Phosphate | 0.3-0.5 | 0.3-0.5 |
| Potassium Chloride | | 0.2-0.4 |
| Natural Flavoring | 0.3-0.5 | 0.3-0.5 |
| Water | 7-9 | 7-9 |
| Total | 100 | 100 |

The present invention is described in the embodiments discussed above, but the embodiments are not intended to limit the scope of the present invention in any way.

What is claimed is:

1. A method of making a food product, comprising:
   providing a dry starch;
   adding water to the dry starch to make a slurry;
   adding a non-sodium, chloride salt in an amount of 15-25% by weight of the starch to the slurry;
   raising a pH of the slurry to pH 11.5 with a non-sodium alkali to make an alkaline slurry;
   hydroxypropylating the starch by adding propylene oxide to the alkaline slurry, to result in a hydroxypropylated starch slurry;
   reducing the pH of the hydroxypropylated starch slurry with an acid, to make a reduced pH slurry; and
   drying the reduced pH slurry to recover the modified starch product, and
   preparing the food product using the modified starch product as an ingredient of the food product,
   wherein the modified starch product comprises hydroxypropylated starch and includes a salt residue from the non-sodium, chloride salt, wherein no wash step is applied to the modified starch product, thereby retaining the salt residue in the modified starch product, and
   wherein the modified starch product has gelatinization onset, peak and end temperatures that are at least 10° C. higher than gelatinization onset, peak and end temperatures of a conventionally hydroxypropylated starch made using a sodium alkali, a sodium salt, and a washing step to remove the sodium salt.

2. The method of claim 1, wherein the food product is selected from the group consisting of a low sodium food product, a reduced sodium food product, a sodium-free food product, and a food product substantially free of sodium.

3. The method of claim 1, wherein the food product comprises at least about 25% less sodium than a reference food product made with a sodium-modified starch, wherein a sodium salt has been used to perform a modification to make said sodium-modified starch.

4. The method of claim 1, wherein the food product comprises about 140 mg or less sodium per serving.

5. The method of claim 1, wherein the acid is hydrochloric acid.

6. The method of claim 1, wherein the reduced pH slurry is acidic.

7. The method of claim 1, wherein the non-sodium, chloride salt is selected from the group consisting of potassium chloride, ammonium chloride, magnesium chloride, calcium chloride, zinc chloride, aluminum chloride, and a combination thereof.

8. The method of claim 1, wherein the step of adding the non-sodium, chloride salt to the slurry comprises adding the non-sodium, chloride salt up to a saturation point of the non-sodium, chloride salt.

9. The method of claim 1, wherein the non-sodium alkali is potassium hydroxide.

10. The method of claim 1, wherein the modified starch product has a gelatinization onset temperature greater than about 74.0° C.

11. The method of claim 1, wherein the modified starch product has a lower enthalpy than the conventionally hydroxypropylated starch.

12. The method of claim 1, wherein the modified starch product has a higher pasting temperature than the conventionally hydroxypropylated starch.

13. The method of claim 1, wherein the modified starch product has a lower peak and final viscosity, and lower breakdown and setback, than the conventionally hydroxypropylated starch.

* * * * *